Jan. 10, 1939.  K. C. D. HICKMAN  2,143,776
RELEASE FOR CAMERA SHUTTERS
Filed Dec. 15, 1936
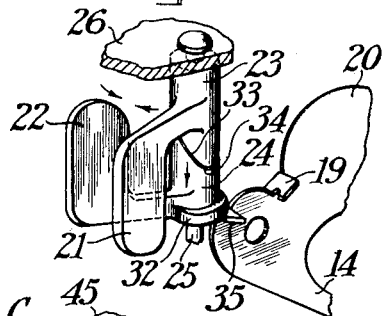
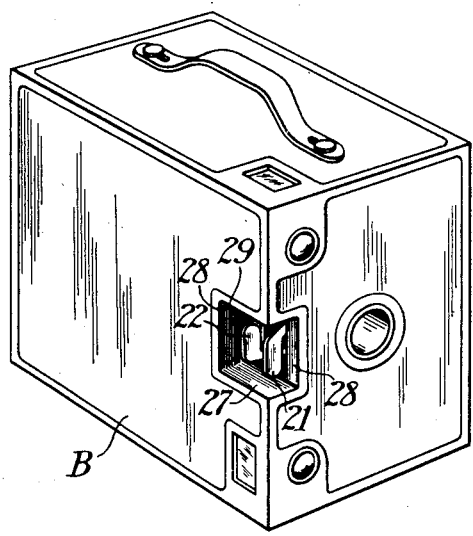
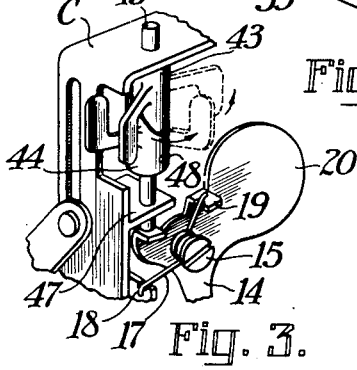
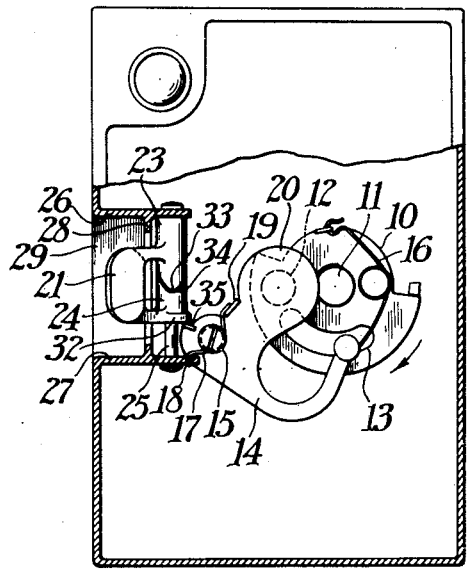
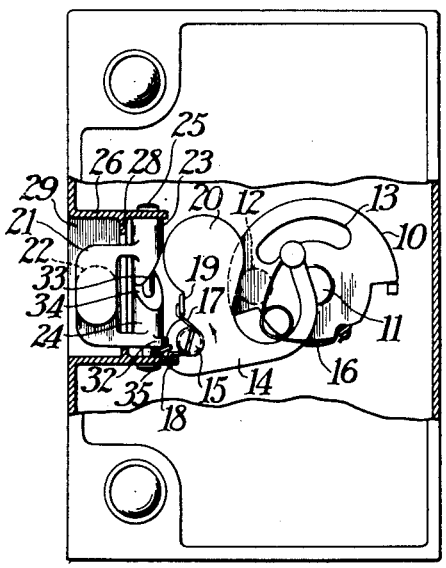
Kenneth C. D. Hickman
INVENTOR.
BY
ATTORNEYS Patented Jan. 10, 1939

2,143,776

UNITED STATES PATENT OFFICE 2,143,776

RELEASE FOR CAMERA SHUTTERS

Kenneth C. D. Hickman, Rochester, N. Y., assignor to Eastman Kodak Company, Rochester, N. Y., a corporation of New Jersey Application December 15, 1936, Serial No. 115,961

12 Claims. (Cl. 95—53)

This invention relates to camera shutter releases, and particularly to a structure that may be readily adapted to release any shutter which has an operating member movable in a single plane. The release mechanism is adapted to contact a portion of the operating member and to move the latter in the same path it would follow if operated by the usual button or cable release.

In small hand cameras, it is frequently difficult to operate the shutter for an exposure without jarring the camera, due to the sudden relief of finger pressure as the shutter "snaps". This is particularly objectionable in the so-called "miniature" cameras, which, because of their light weight are more likely to be moved while the shutter is open, and a proportionately greater blur in the picture results because of the small size thereof.

It is an object of this invention, therefore, to produce a release mechanism adapted to contact the operating member of a shutter or a part equivalent thereto, in such a manner that there will be no jar from the operator's finger because of his inability to cease pressure at the instant of exposure. It is another object of the invention to so construct a shutter release that one part thereof reacts against another part of said mechanism, so that to some extent at least there is a balanced effect which tends to absorb some of the operator's applied force. A further object is to produce a shutter release that may be readily adapted to various types of shutters and cameras without being entirely redesigned for each particular condition, thus promoting low cost construction. Still another object is to so arrange the release that its operating members may be moved into various operative positions without changing the position of the shutter mechanism.

To these and other ends, a preferred form of release has been devised as illustrated in the accompanying drawing. However, the device is capable of modification to adapt it to particular camera structures, and the invention should be construed as to embrace any and all forms thereof that may be indicated in the claims at the end of this specification.

In the drawing in which like reference characters designate like parts throughout:

Fig. 1 is a perspective view of a box-type camera to which my improved shutter-release has been adapted; and illustrates a preferred embodiment of my invention;

Fig. 2 is a front elevation of the camera of Fig. 1, part of the front being removed to show the shutter and the release device, the shutter being at rest;

Fig. 3 is a similar elevation, the shutter being shown at the end of its exposure movement;

Fig. 4 is a fragmentary perspective view of the release element detached from the camera, with a part of the shutter indicated in its associated location, and, Fig. 5 is a similar perspective view of a slightly different embodiment of my invention showing the shutter release applied to the retractable front of a known type of folding camera.

Referring first to Figs. 2 and 3, a typical shutter to which this invention is readily adaptable is shown as comprising broadly a shutter disc 10 pivoted at 11 and adapted to be oscillated past a lens aperture 12, whereby light is admitted to a film in the camera as an arcuate slot 13 passes over said aperture. The shutter disc 10 is moved by a master member or driver 14 pivoted at 15 and connected to said disc through a spring 16. The latter is arranged so that it is compressed when the driver 14 is moved counterclockwise (as viewed in Fig. 2) and its accumulated energy is released when the ends of the spring attain a certain relation to the pivot 11, thus "snapping" the disc 10 around, clockwise to the position of Fig. 3 to make an exposure.

One end of a spring 17 is anchored at 18 and its other end engages a lug 19 on the driver 14. This spring is much stronger than the spring 16, so that the driver is constantly urged in a clockwise direction about its pivot 15, and when it is permitted to move in that direction, it will return the disc 10 to its original position (Fig. 2). A cover plate 20 which is an extension of the driver 14 will overlie the aperture 12 while the disc 10 is returning to normal position, preventing double exposure as a reverse movement of parts after making an exposure occurs.

It should be understood that the shutter above described, and shown in the drawing, is a well-known type, suitable for operation by the release mechanism which constitutes the subject of the invention, and that other shutters may be substituted. The release mechanism may be readily adapted to any shutter having a main driver or operating member that is movable in a plane substantially parallel to the camera-front, or which is capable of continuous movement for a limited distance in any plane.

Referring now to Fig. 3, the release is shown as comprising a pair of finger grips 21 and 22, which are, respectively, a part of arms extending outwardly from tubular members 23 and 24, arranged to turn freely on a post 25. As applied to a box-type camera, (Fig. 1), this post may be fixed in walls 26 and 27 that extend within the camera body B, and which, with a third wall 28, form a recess 29 in said body. The grips 21 and 22 constitute manual members which by reason of lying entirely within the recess 29 are not likely to be moved accidentally.

When the operator draws these grips together as by squeezing them between his thumb and forefinger, the tubular members 23 and 24 are rotated in opposite directions on the post 25. When this occurs, said tubular members are mutually repelled through the interengagement of cam surfaces 33 and 34 thereon, so that the member 24 is moved along the post 25 in the direction of the arrow in Fig. 4. The member 23, being in contact with wall 26 may rotate but cannot rise longitudinally on the post 25, so that the squeezing of the finger grips 21 and 22 by the operator is wholly translated (in this instance) into vertical downward movement of the member 24.

A lug or flange 32 is provided on the member 24, and this flange is at all times in contact with a lug 35 on the driver 14, so that downward movement of the member 24 immediately swings the driver 14 on its pivot 15 as previously described, against the action of spring 17, (Fig. 3). The latter is sufficiently powerful not only to return the shutter parts to normal, but also to raise the cam member 24 to its initial position and by the rotary effect thus imparted to the member 23, the two cam members again will assume the position of Figs. 2 and 4, with the finger-grips 21 and 22 spaced apart as shown. The cam surfaces 33 and 34 are comparatively steep, so that a small movement around the post 25 results in a considerable movement of the member 24 longitudinally of said post.

In the modification illustrated in Fig. 5, the post, designated as 45, instead of being fixed in its supports 46 and 47, is free to move longitudinally with the cam member 44, which, as in the previously described construction, is adapted to be moved downwardly when rotated, by reaction against the cam member 43. The post 45, being pinned or otherwise attached as at 48 to the member 44, moves with the latter, and the lower end of said post, being in contact with the lug 35 on the driver 14, actuates the shutter when the finger-grips 21 and 22 are brought together.

When constructed in accordance with Fig. 5 the entire release assembly may be rotated about the post 45 as a pivotal point, so that the finger-grips may be turned to lie within the camera front and not to interfere with retraction of the latter as indicated in broken lines. The shutter will not be operated by swinging the release about the post, such operation only being effected by squeezing the finger grips together. This may be done with the grips in the dotted line position, or with the finger grips in any position between the full and dotted line positions that might be comfortable for the operator.

Because the force imparted to the finger grips is translated into movement substantially perpendicular to the application of the force, and to the movement of said finger grips to operate the shutter, and also due to the balanced or mutually repellent interaction of the cam members, there is no tendency, at the moment of "snap" of the shutter disc, for the force to impart a jar to the camera. It has been found that with small cameras of light weight equipped with this release, that sharp pictures are readily obtained without any special consideration by the operator as to the camera position or the method of holding it. Shutter springs of greater or less tension may also be employed, for higher or lower exposure speeds, without having any adverse effect on the steadiness of the camera. It is apparent that a distinct improvement has been accomplished by thus rendering small hand-held cameras substantially immune to the sudden jar that frequently results from the inability of the operator to determine the exact instant of shutter "snap" and then to cease the pressure of his finger at the precise split-second when the shutter blade has started and has moved beyond the point where it will not return to its initial position until the exposure movement has occurred.

While I have illustrated my invention as applied to types of shutters which are well known, it is to be understood that the above description and the drawing are by way of illustration only and it will be readily apparent to one skilled in the art that my improved shutter releasing grips may be applied to a large variety of other shutter constructions. My invention is of course particularly desirable for small and light weight cameras because these are so easily shaken. However, I have found such a release equally useful on larger cameras as well.

I claim:

1. A camera shutter release comprising a pair of contacting cam members, a support carrying both cam members on which one cam member is movably mounted, means for moving said cam members in opposite directions to produce relative movement therebetween, a shutter operating member adjacent the movably mounted cam member, whereby the movably mounted cam member may actuate said shutter operating member when the means for moving said cam members in opposite directions are moved.

2. A camera shutter release comprising a rotatably mounted support, a pair of cam members mounted thereon, one fixedly and one movably mounted on the support, said cam members having cam faces adapted to react against each other when said members are partially rotated in opposite directions moving one cam member relative to the other on the support, a shutter actuating member adjacent the cam members, whereby when one of said cam members is displaced by the other the displaced cam member is adapted to actuate said shutter operating member.

3. A camera shutter release comprising a supporting rod, a pair of tubular members mounted on the rod and having interengaging cam faces, said cam faces being so disposed that movement of said tubular members in opposite directions relative to each other may produce movement of one tubular member relative to the rod, a shutter operating member lying in the path of the movable cam member whereby movement of said cam member may actuate said shutter actuating member.

4. A camera shutter release comprising a pair of tubular members, a rotatable support therefor, one tubular member being rotatable with said support and one tubular member being rotatable independently of said support, means for moving and adapted for causing partial rotation of said tubular members in opposite directions, a shutter operating member adjacent said support, and means whereby partial opposite rotation of the tubular members causes the movable tubular member to move in a direction normal to the plane of rotation and thereby to contact and actuate said shutter operating member.

5. A camera shutter release comprising a pair of tubular members, a mount passing through both tubular members, a shutter operating member, one of said members being in contact with the shutter operating member, means for moving and adapted to impart rotary movement to the tubular members in opposite directions, interengaging cam faces on said tubular members, said cam faces being so arranged that partial rotation of said tubular members in opposite directions causes the tubular member in contact with the shutter operating member to move axially of the mount to actuate the shutter operating member.

6. A camera shutter release comprising a post, a pair of contacting cam members mounted on the post, one cam member being attached thereto and the other cam member being movable thereon, whereby the cams may move one relative to the other said cam members having faces adapted to react against each other to produce axial movement of one of said members relative to the post, a shutter actuating member adjacent the movably mounted cam member, means for moving the cam members relative to each other to produce axial movement of one cam member, whereby said movably mounted cam member may contact with and actuate said shutter operating member when said cam members are moved in opposite directions.

7. A shutter release comprising a post, oppositely disposed rotatable members provided with finger grips mounted on said post, one member being fixedly attached thereto and one member being movably mounted to move in two directions thereon, cam faces on said rotatable members so arranged that movement of said finger grips together causes one of said cam faces to react against the other to move the movable member axially of the post and a shutter operating member lying in a path of the movably mounted member and adapted to be actuated thereby.

8. In a shutter for cameras, the combination with a shutter casing having mechanism therein for making an exposure including a shutter operating member and a post carried by the casing, of a pair of tubular members mounted on said post, one fixedly attached thereto and the other movable thereon in two directions, means for moving the tubular members in opposite directions, interengaging cam faces on said tubular members, said cam faces being so arranged that opposite movement of the tubular members produces a relative movement therebetween axially of said post to actuate said shutter operating member.

9. In a shutter for cameras, the combination with a shutter casing having mechanism therein for making an exposure including a shutter operating member, of a rotatably mounted post carried by the shutter, a pair of tubular members mounted on said post, one being fixedly attached thereto and the other movably mounted thereon, finger grips for imparting rotational movement to said tubular members, in the same or opposite directions, interengaging cam faces on said tubular members so arranged that opposite partial rotation of said tubular members produces axial movement of the movably mounted member whereby the shutter operating member may be actuated.

10. A camera shutter release comprising a rotatably mounted post, a pair of tubular members mounted, one fixedly and the other movably on said post, said tubular members and post being movable both together and in opposite directions, and means whereby opposite partial rotation of said tubular members on said post may cause the movably mounted member to move axially of said post, a shutter actuating member arranged in the path of said movably mounted member whereby said tubular members may be turned upon said post to a convenient shutter operating position and by operating said tubular members in opposite directions, said shutter actuating member may be operated.

11. In a shutter for cameras, the combination, with a shutter casing, of a post rotatably mounted therein, mechanism for making an exposure including a shutter operating member lying adjacent said post, means for actuating the latter comprising a pair of interengaging cams, one cam fixedly mounted on said post and the other cam mounted on said post to move in two directions, a finger grip carried by each cam, said cams being so arranged that movement of said finger grips in opposite directions causes relative axial displacement of the movably mounted cam to actuate the shutter operating member.

12. In a shutter for cameras, the combination with a shutter casing, of a rotatably mounted post carried thereby, a mechanism therein for making an exposure including a shutter operating member adjacent said post, means for actuating the shutter operating member comprising a pair of relatively movable finger grips, one fixedly and one mounted on said post to move in two directions, both of said finger grips having interengaging cams whereby relative movement thereof may cause the movably mounted cam to move axially of the post to engage and actuate the shutter operating member, said rotatably mounted post permitting both finger grips to be moved to a convenient operating position before actuating the shutter.

KENNETH C. D. HICKMAN.